April 22, 1958 — A. RIEBEN — 2,831,614
APPARATUS FOR THE PROJECTION OF SUBSTANCES IN POWDER FORM
Filed May 11, 1955
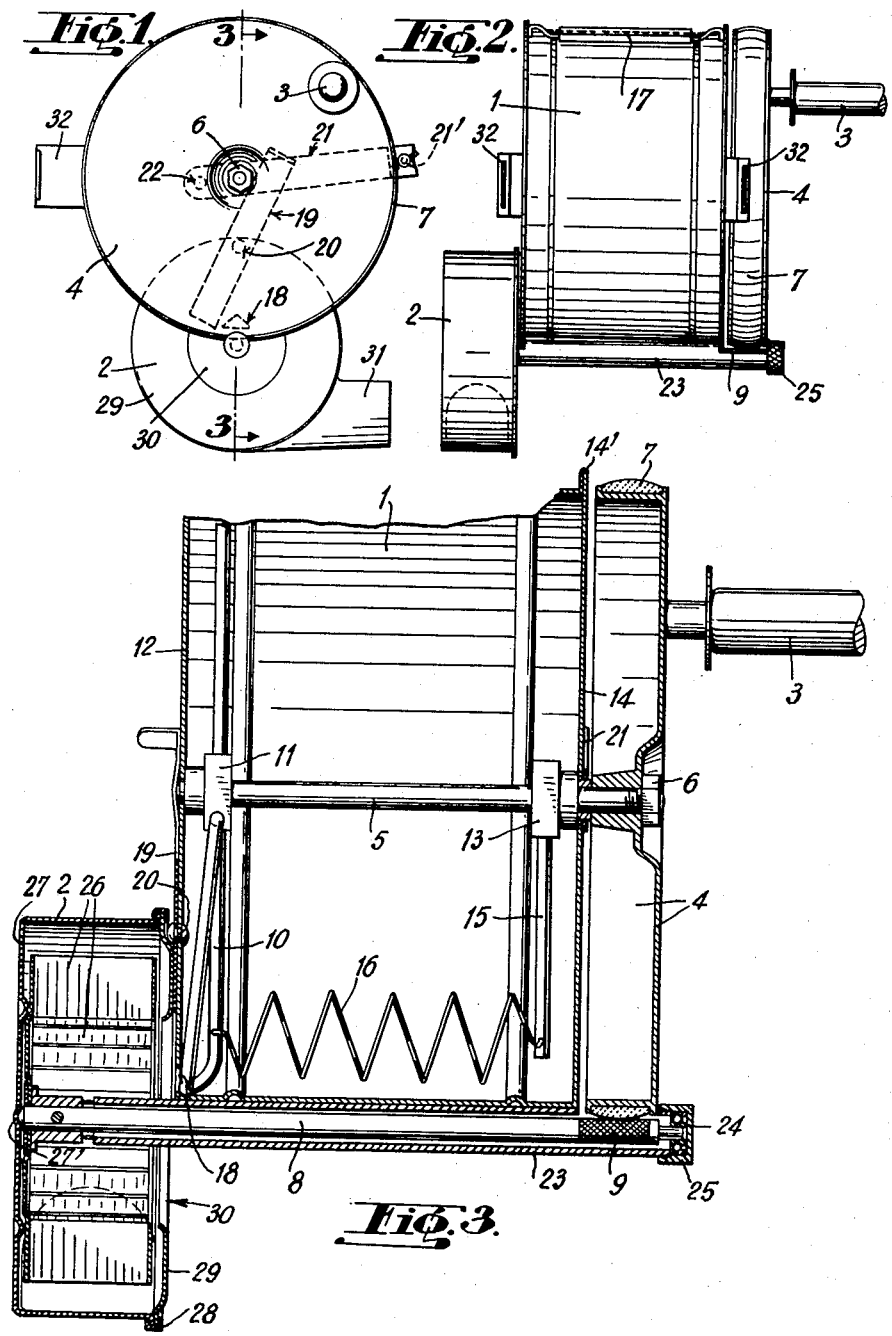

United States Patent Office 2,831,614
Patented Apr. 22, 1958

2,831,614

APPARATUS FOR THE PROJECTION OF SUBSTANCES IN POWDER FORM

Albert Rieben, Corseaux pres Vevey, Switzerland, assignor to Messrs. Berthoud & Cie, Corseaux pres Vevey, Switzerland Application May 11, 1955, Serial No. 507,700

Claims priority, application Switzerland May 25, 1954

4 Claims. (Cl. 222—193)

The object of the present invention is to provide an apparatus for the projection of substances in powder form, of the type comprising a drum serving as a reservoir for the substance to be projected, a blower for producing a jet of air, and hand-operated means which simultaneously serve to bring the substance in powder form from the drum to the blower and to drive the latter.

In the known apparatus of this type, the blower is driven by means of a crank handle through a train of gears. This arrangement makes the apparatus heavy and makes it difficult to dismantle by an inexperienced hand.

The object of the present invention is to remedy these disadvantages and the apparatus which achieves this object is characterized by the fact that it comprises a wheel, arranged at one of the extremities of the drum and serving to drive the shaft of the blower through friction means, this wheel being fitted with a crank handle for its actuation.

The accompanying drawing illustrates, by way of example, an embodiment of the apparatus which constitutes the object of the invention.

Fig. 1 is a front elevation of this apparatus.

Fig. 2 is a side view of the same.

Fig. 3 is a larger scale cross-sectional view along the line 3—3 in Fig. 1.

The apparatus illustrated is destined to project substances in powder form, in particular insecticide powders for the treatment of, for instance, fruit trees, grape vines, etc. This apparatus comprises a drum 1 serving as a reservoir for the substance to be projected, a blower, generally indicated by the reference numeral 2, for producing a jet of air and means which are hand-operated by means of a crank handle 3 and which simultaneously serve to bring the substance in powder form from the drum to the blower and to drive the latter as will be described further on. To this effect, the apparatus comprises a wheel 4 mounted at one of the extremities of the drum 1 on a shaft 5 which passes axially through this drum; a nut 6 holds the wheel 4 on the end of the shaft 5. This wheel 4 is provided at its periphery with a lining 7 serving to drive a shaft 8 of the blower 2 by friction against a milled part 9 of this shaft. The crank handle 3 is secured to the wheel 4 and serves to drive it.

In addition, the shaft 5 carries a propulsive member 10 constituted by at least two propeller blades made of round iron rod and mounted on a hub 11 which is disposed adjacent to the end wall 12 at the other extremity of the drum 1. A hub 13 which is secured on shaft 5 adjacent to the end wall 14 at the first mentioned extremity of the drum carries a radial rod 15 to which is secured one extremity of a helicoidally wound metallic wire 16 the other extremity of which is secured to the propulsive member 10. Instead of the metallic wire 16, any appropriate stirring device could be provided.

The substance in powder form is introduced into the drum 1 through an opening (which is not shown) normally closed by a lid 17. An outlet opening 18 in end wall 12 enables the powder to pass from the drum into the blower. This opening can be opened or shut by a flap 19 pivoted at 20 on the end wall 12.

The shaft 5 rotates, in the neighbourhood of the extremity which carries the wheel 4, in a member 21 which pivots at 22 on the end wall 14 in order that the distance between the shaft 5 and the shaft 8 of the blower, and consequently the contact between the lining 7 of the wheel 4 and the milled part 9 of the shaft 8 may be adjusted at will.

The end of the member 21 is bent over so as to pass over a flange 14' of the end wall 14 and a winged screw 21' enables this member 21 to be blocked in the desired position.

The shaft 8 passes loosely through a tubular member 23 secured to the drum 1 and its extremity which is adjacent to the milled part 9 runs in a ball bearing 24 lodged in a cap 25 screwed onto a threaded extremity of the tube 23. The other extremity of the shaft 8 carries a paddle wheel 26 mounted inside a casing 27. A dented part 27' of this casing forms a thrust bearing for the appropriately shaped extremity of the shaft 8 when the latter is in the working position, as shown in Fig. 3. The casing 27 is secured in a removable manner by means of a collar 28 to a member 29 forming part of the drum 1 and provided with an opening 30 for admitting air to the blower, while the outlet duct of the blower is indicated in 31.

Two loops 32 secured to the drum 1 serve to receive a strap (which has not been shown) by which the apparatus may be carried.

The described apparatus functions in the following manner:

When the wheel 4 is turned by means of the crank handle 3, the shaft 5 drives the propulsive member 10 and the helicoidal wire 16. The powder contained in the drum 1 is thus brought to the opening 18 and from there into the blower 2 by the member 10, the wire 16 serving to stir the mass of powder in order to prevent the formation of lumps. Simultaneously, the wheel 4 drives the shaft 8 owing to the friction of the lining 7 against the milled part 9 of this shaft. The paddle wheel 26 runs at high speed, sucks in air through the opening 30 and drives it into the duct 31 after it has been mixed with the powder delivered through the opening 18.

If the lining 7 is worn, the wheel 4 can be moved slightly by means of the member 21, which enables the desired friction contact to be re-established between the lining 7 and the milled part 9.

An important advantage of the described apparatus resides in the fact that it is not fitted with a train of gears for the drive of the blower as is the case in the known apparatus of this type. This allows an apparatus of simpler and lighter construction to be obtained which is especially advantageous from the point of view of the dismantling and utilisation. In fact to dismantle the blower, it is only necessary to open the collar 28 to enable the casing 27 to be removed and so to free the paddle wheel 26. The latter can then be withdrawn with its shaft 8 from the tubular member 23. On the other hand access can be had to the ball bearing 24 by simply unscrewing the cap 25.

What I claim is:

1. Apparatus for projecting a substance in powder form comprising a non-rotating drum forming a reservoir for the substance to be projected and having an outlet opening, a blower casing mounted on said drum and communicating with said outlet opening to receive the substance to be projected from said drum, means defining a discharge passageway opening from said casing, blower means in said casing adapted, upon rotation, to project the substance from said casing through said discharge passageway, an axle connected to said blower means for the rotation of the latter, means rotatably supporting said axle on said drum with the axis of said axle extending parallel to the central axis of said drum, a shaft extending longitudinally in said drum, a wheel on one end of said shaft and carrying a crank handle by which said wheel and shaft can be manually rotated, means on the periphery of said wheel in direct frictional contact with said axle to rotate the latter upon rotation of the wheel, means movably mounted on said drum and rotatably supporting said shaft, at least adjacent said one end of the latter, so that adjustment of said means movably mounted on the drum serves to adjust the frictional contact between said axle and said means on the periphery of the wheel, and means carried by said shaft within the drum and operative, upon rotation of the shaft, to propel the substance in the drum toward said outlet opening.

2. Apparatus as in claim 1; wherein said means on the periphery of the wheel consists of friction lining extending around said wheel, and said axle has a milled portion engaged by said friction lining.

3. Apparatus as in claim 1; wherein said means movably mounted on the drum includes a lever pivoted on said drum to swing relative to the latter in a plane perpendicular to the longitudinal axis of the drum and having said shaft rotatably supported therein at a location spaced radially from the pivoting axis of the lever; and further comprising cooperative means on said drum and lever for locking the latter in a selected angular position relative to said drum.

4. Apparatus as in claim 1; wherein said means rotatably supporting said axle on said drum includes an open ended tubular member secured to said drum and loosely receiving said axle, said tubular member having a removable cap at one end containing a ball bearing rotatably supporting the adjacent end of said axle, and said blower casing includes a removable portion having a thrust bearing defining seat receiving the end of said axle remote from said cap.

References Cited in the file of this patent

UNITED STATES PATENTS

| | | |
|---|---|---|
| 1,496,120 | Hilger | June 3, 1924 |
| 1,652,732 | Root | Dec. 13, 1927 |
| 2,017,139 | Wood | Oct. 15, 1935 |
| 2,208,853 | Oys | July 23, 1940 |
| 2,283,805 | Gustafson | May 19, 1942 |
| 2,515,485 | Allienne | July 18, 1950 |

FOREIGN PATENTS

| | | |
|---|---|---|
| 328,201 | Italy | July 31, 1935 |
| 643,675 | Great Britain | Sept. 27, 1950 |